US006415207B1

(12) United States Patent
Jones

(10) Patent No.: US 6,415,207 B1
(45) Date of Patent: Jul. 2, 2002

(54) SYSTEM AND METHOD FOR AUTOMATICALLY PROVIDING VEHICLE STATUS INFORMATION

(75) Inventor: Martin Kelly Jones, Vancouver (CA)

(73) Assignee: Global Research Systems, Inc., Rome, GA (US)

(*) Notice: Subject to any disclaimer, the term of this patent is extended or adjusted under 35 U.S.C. 154(b) by 0 days.

(21) Appl. No.: 09/516,476

(22) Filed: Mar. 1, 2000

Related U.S. Application Data

(60) Provisional application No. 60/122,482, filed on Mar. 1, 1999.

(51) Int. Cl.[7] .................................................. G05D 1/00

(52) U.S. Cl. ............................... 701/1; 701/29; 701/35; 701/117; 342/357.06; 342/357.12

(58) Field of Search ............................ 701/29, 35, 117, 701/1, 200, 204; 342/357.06, 357.12; 340/994

(56) References Cited

U.S. PATENT DOCUMENTS

| | | | | |
|---|---|---|---|---|
| 3,644,883 A | | 2/1972 | Borman et al. | 340/991 |
| 3,845,289 A | | 10/1974 | French | 701/117 |
| 4,297,672 A | | 10/1981 | Fruchey et al. | 340/994 |
| 4,325,057 A | | 4/1982 | Bishop | 340/994 |
| 4,791,571 A | | 12/1988 | Takahashi et al. | 701/117 |
| 4,812,843 A | | 3/1989 | Champion, III et al. | 340/905 |
| 4,924,496 A | * | 5/1990 | Figa et al. | 378/173 |
| 4,956,777 A | | 9/1990 | Cearley et al. | 701/24 |
| 5,021,780 A | | 6/1991 | Fabiano et al. | 340/994 |
| 5,113,185 A | | 5/1992 | Ichikawa | 340/995 |
| 5,122,959 A | | 6/1992 | Nathanson et al. | 701/117 |
| 5,131,020 A | | 7/1992 | Liebesny et al. | 455/422 |
| 5,168,451 A | | 12/1992 | Bolger | 701/117 |
| 5,218,629 A | | 6/1993 | Dumond, Jr. et al. | 455/412 |
| 5,223,844 A | | 6/1993 | Mansell et al. | 342/357.07 |
| 5,299,132 A | | 3/1994 | Wortham | 455/457 |
| 5,323,456 A | | 6/1994 | Oprea | 379/375 |
| 5,351,194 A | | 9/1994 | Ross et al. | 455/456 |
| 5,381,338 A | | 1/1995 | Wysocki et al. | 701/207 |
| 5,394,332 A | | 2/1995 | Kuwahara et al. | 701/211 |
| 5,400,020 A | | 3/1995 | Jones | 340/994 |
| 5,420,794 A | | 5/1995 | James | 701/117 |
| 5,444,444 A | | 8/1995 | Ross | 340/994 |
| 5,461,374 A | | 10/1995 | Lewiner et al. | 340/994 |
| 5,493,295 A | | 2/1996 | Lewiner et al. | 340/994 |
| 5,515,421 A | | 5/1996 | Sikand et al. | 379/88.21 |
| 5,519,621 A | | 5/1996 | Wortham | 455/99 |
| 5,539,810 A | | 7/1996 | Kennedy, III et al. | 379/88.25 |

(List continued on next page.)

FOREIGN PATENT DOCUMENTS

| | | | |
|---|---|---|---|
| FR | 2 559 930 | 8/1985 | G08G/1/12 |
| FR | 2674355 | 9/1992 | G08G/1/123 |
| JP | 52066175 | 6/1977 | |
| JP | 63288400 | 11/1988 | G08G/1/12 |

*Primary Examiner*—William A. Cuchlinski, Jr.
*Assistant Examiner*—Marthe Y. Marc-Coleman
(74) *Attorney, Agent, or Firm*—Thomas, Kayden, Horstemeyer & Risley, LLP

(57) ABSTRACT

A system for monitoring and reporting vehicle status information includes a database, a communication interface, and a system manager. The database stores status information associated with a vehicle, and the communication interface is designed to communicate with communication devices remotely located from the system. The system manager receives a message transmitted from the vehicle and updates the status information stored in the database based on the received message. When a remote communication device establishes communication with the communication interface, the communication interface receives caller identification information automatically transmitted to the communication interface. The system manager analyzes this caller identification information and automatically retrieves status information from the database based on the caller identification information. The system manager then transmits, via the communication interface, the retrieved status information to the remote communication device.

15 Claims, 3 Drawing Sheets

U.S. PATENT DOCUMENTS

| | | | | | |
|---|---|---|---|---|---|
| 5,544,225 | A | | 8/1996 | Kennedy, III et al. | 455/412 |
| 5,546,444 | A | | 8/1996 | Roach, Jr. et al. | 455/412 |
| 5,579,376 | A | | 11/1996 | Kennedy, III et al. | 455/411 |
| 5,587,715 | A | | 12/1996 | Lewis | 342/357.03 |
| 5,590,178 | A | * | 12/1996 | Murakami et al. | 379/96 |
| 5,594,650 | A | | 1/1997 | Shah et al. | 701/207 |
| 5,623,260 | A | | 4/1997 | Jones | 340/994 |
| 5,648,770 | A | | 7/1997 | Ross | 340/994 |
| 5,652,707 | A | | 7/1997 | Wortham | 455/456 |
| 5,657,010 | A | | 8/1997 | Jones | 340/994 |
| 5,668,543 | A | | 9/1997 | Jones | 340/994 |
| 5,673,305 | A | | 9/1997 | Ross | 455/517 |
| 5,694,322 | A | | 12/1997 | Westerlage et al. | 705/417 |
| 5,699,275 | A | | 12/1997 | Beasley et al. | 709/221 |
| 5,719,771 | A | | 2/1998 | Buck et al. | 455/456 |
| 5,732,074 | A | | 3/1998 | Spaur et al. | 370/313 |
| 5,736,940 | A | | 4/1998 | Burgener | 340/994 |
| 5,751,245 | A | | 5/1998 | Janky et al. | 342/357 |
| 5,758,313 | A | * | 5/1998 | Shah et al. | 455/456 |
| 5,760,742 | A | | 6/1998 | Branch et al. | 342/457 |
| 5,771,455 | A | | 6/1998 | Kennedy, III et al. | 455/456 |
| RE35,920 | E | | 10/1998 | Sorden et al. | 342/457 |
| 5,929,752 | A | * | 7/1999 | Janky et al. | 340/426 |
| 6,006,159 | A | | 12/1999 | Schmier et al. | 701/200 |
| 6,094,477 | A | * | 7/2000 | Nada et al. | 379/93.24 |
| 6,166,626 | A | * | 12/2000 | Janki et al. | 340/426 |

* cited by examiner

SYSTEM AND METHOD FOR AUTOMATICALLY PROVIDING VEHICLE STATUS INFORMATION

CROSS-REFERENCE TO RELATED APPLICATION

This application claims priority to and the benefit of the filing date of U.S. Provisional Application Serial No. 60/122,482, filed on Mar. 1, 1999, and entitled "Base Station Apparatus and Method for Monitoring Travel of Mobile Vehicle."

BACKGROUND OF THE INVENTION

1. Field of the Invention

The present invention generally relates to vehicle information systems and, in particular, to a system and method for maintaining vehicle status information and of automatically and efficiently providing this information to users after communication is established with the users.

2. Related Art

Presently, it is possible for users to call a central processing station to obtain information on the status of a vehicle of interest. For example, it is possible for a user to call an airline or a bus depot and find out whether an airplane or bus is on or off schedule. In some situations a human operator at the processing station (e.g., the airline or bus depot) receives the call from the user who asks the operator for information regarding the status of a particular vehicle. The operator then looks up the status of the vehicle from a chart or database and provides the user with the requested information.

In other situations, the status information is automatically provided to the user after the user has submitted a status information request, thereby eliminating the need of human interaction at the processing station. For example, once communication with a communications device at the processing station is established, a computer at the processing station may prompt the user to identify which vehicle the user is interested in. The user may enter a vehicle identifier, such as an airplane number or bus number, for example, via touch-tone signaling or other suitable technique for interfacing information with computer systems. The computer then automatically retrieves information pertaining to the status of the vehicle identified by the user's inputs and provides this information to the user.

Having to provide either the operator or the computer with information identifying which vehicle is of interest to the user is timing consuming and burdensome. It would be desirable for the processing station to automatically provide the user with status information on a particular vehicle without the user having to provide a vehicle identifier.

Thus, a heretofore unaddressed need exists in the industry for providing a system and method of maintaining vehicle status information and of automatically and efficiently providing users with this information.

SUMMARY OF THE INVENTION

The present invention overcomes the inadequacies and deficiencies of the prior art as discussed hereinbefore. Generally, the present invention provides a system and method for automatically providing a user with vehicle status information related to a particular vehicle or a particular set of vehicles.

In architecture, the system of the present invention utilizes a database, a communication interface, and a system manager. The database stores status information associated with a vehicle, and the communication interface is designed to communicate with communication devices remotely located from the system. The system manager receives a message transmitted from the vehicle and updates the status information stored in the database based on the received message. When a remote communication device establishes communication with the communication interface, the communication interface receives caller identification information automatically transmitted to the communication interface. The system manager analyzes this caller identification information and automatically retrieves status information from the database based on the caller identification information. The system manager then transmits, via the communication interface, the retrieved status information to the remote communication device.

The present invention can also be viewed as providing a method for monitoring and reporting status of vehicles. The method can be broadly conceptualized by the following steps: maintaining status information associated with a vehicle; communicating with a remote communication device; receiving caller identification information automatically transmitted in the communicating step; and automatically retrieving and transmitting the status information based on the caller identification information.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
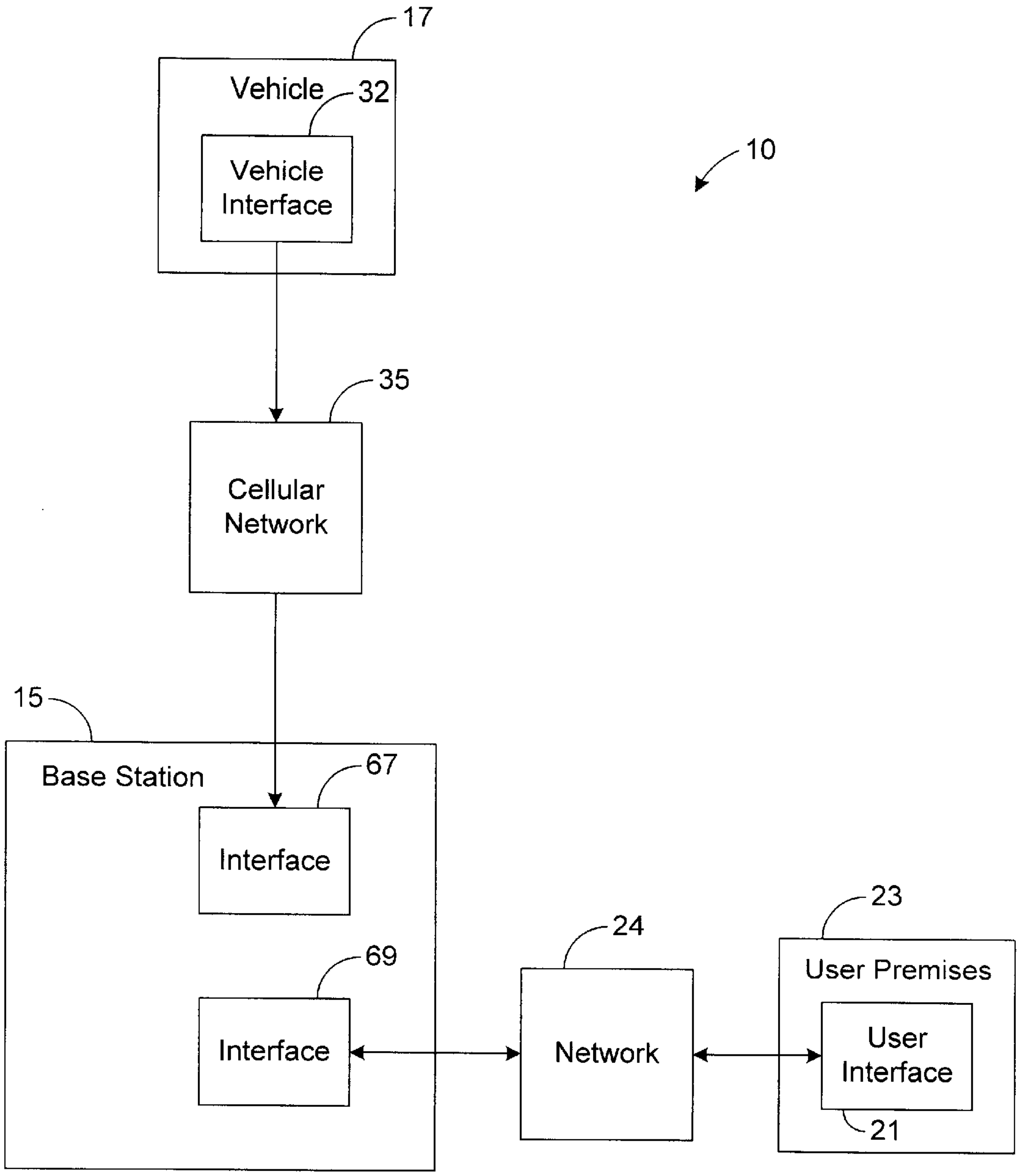
FIG. 1 is a block diagram illustrating a system for monitoring and reporting status of vehicles in accordance with the present invention.

FIG. 1 depicts a vehicle tracking system 10 in accordance with the preferred embodiment of the present invention. The system 10 includes a base station 15 configured to store information regarding the status of at least one vehicle 17. For example, the base station 15 may store a value indicating the time that the vehicle 17 is expected to arrive at a particular location.

The base station 15 is configured to communicate with a user interface 21 at a user's premises 23 via a communications network 24, such as the publicly switched telephone network (PSTN), for example. In this regard, the base station 15 may be configured to determine when the vehicle 17 is within a predetermined proximity (e.g., time or distance) from a particular location and to transmit a notification message to the user interface 21 to warn a user at the premises 23 of an impending arrival of the vehicle 17 at the particular location. A base station 15 capable of tracking vehicle 17 and of transmitting such a notification message is fully described in U.S. Patent Application entitled "Base Station Apparatus and Method for Monitoring Travel of a Mobile Vehicle," assigned Ser. No. 09/395,501, and filed on Sep. 14, 1999, which is incorporated herein by reference.

The notification message can be transmitted via a telephone call, a page, an e-mail message, or any other suitable technique for communicating data. The user interface 21 is preferably any communication device or devices capable of communicating with base station 15 and, therefore, of receiving and processing the notification message. For example, the user interface 21 may be a telephone, a pager, a modem, or other suitable communication device.

In the preferred embodiment, the user interface 21 may be configured to establish communication with the base station 15 to discover the status of a particular vehicle 17. Once communication with the base station 15 is established, the base station 15 is configured to automatically identify the user associated with the user interface 21 without prompting the user for inputs.

For example, in conventional telephony systems, caller identification (caller I.D.) information, such as the caller's telephone number, name, address, etc., is often automatically transmitted to the party receiving the call so that the party receiving the call can identify the caller before answering. U.S. Pat. No. 4,924,496, entitled "Automatic Incoming Telephone Call Originating Number and Party Display System" and issued on May 8, 1990, which is incorporated herein by reference, describes a process of automatically transmitting caller I.D. information without prompting the caller for inputs. The base station 15 is designed to utilize this caller I.D. information to identify the user at premises 23 that established communication with base station 15.

Furthermore, the base station 15 is preferably aware of which users are associated with which vehicles 17. Accordingly, after identifying the user who established communication with the base station 15, the base station 15 is configured to automatically retrieve status information pertaining to the vehicle or vehicles 17 associated with the user and to transmit this information to the user interface 21, which interfaces this information with the user at premises 23. Therefore, the user is able to receive status information pertaining to a vehicle 17 associated with the user without having to manually provide inputs to the base station 15 to identify the associated vehicle 17.

To ensure that the information provided to the user is accurate, the base station 15 is designed to update the status information stored in the base station 15, when the vehicle 17 is unexpectedly late or early. In this regard, the vehicle 17 includes a vehicle interface 32 capable of communicating with the base station 15 via wireless signals. For example, in the preferred embodiment, the vehicle interface 32 may comprise a cellular telephone capable of transmitting wireless signals to base station 15 via a cellular network 35. However, in other embodiments, the vehicle interface 32 may be comprised of another device or devices capable of communicating with the base station 15 either directly or through another type of network.

When the vehicle 17 is off schedule or when another event pertaining to the status of the vehicle 17 occurs, a status message is transmitted to the base station 15 to notify the base station 15 of the event. The status message may be manually interfaced with vehicle interface 32 via buttons or switches, for example, or may be automatically generated by the vehicle interface 32. U.S. Patent Application entitled "Apparatus and Method for Monitoring Travel of a Mobile Vehicle," assigned Ser. No. 09/395,497, and filed on Sep. 14, 1999, which is incorporated herein by reference, describes a system in which a status message is automatically transmitted when the vehicle 17 is off schedule.

The base station 15 is configured to receive the status message and to update the status information stored in the base station 15 in response to the status message. Therefore, the status information stored in the base station 15 should be accurate and up to date.

Figure 2:
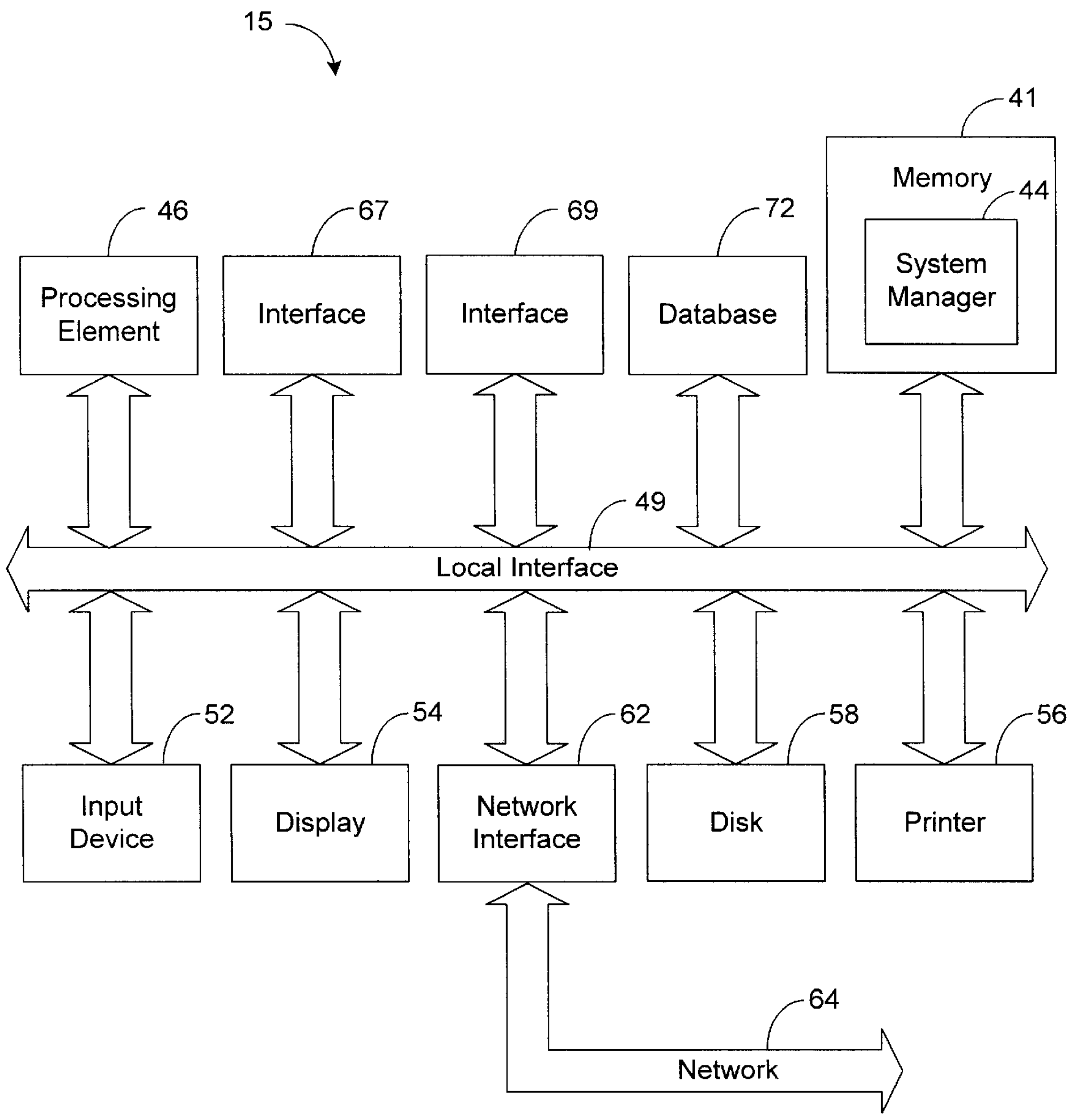
FIG. 2 is a block diagram illustrating a computer system implementing a base station depicted in FIG. 1.

FIG. 2 depicts a more detailed view of the base station 15. In the embodiment shown by FIG. 2 the base station 15 is implemented as a computer having memory 41. The base station 15 preferably includes a system manager 44 that controls the operation of the base station 15. The system manager 44 can be implemented in software, hardware, or a combination thereof. In the preferred embodiment, as illustrated by way of example in FIG. 2, the system manager 44 of the present invention along with its associated methodology is implemented in software and stored in memory 41.

Note that the system manager 44, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the system manager 44 may be magnetically stored and transported on a conventional portable computer diskette.

The preferred embodiment of the base station 15 of FIG. 2 also comprises one or more conventional processing elements 46, such as a digital signal processor (DSP), that communicate to and drive the other elements within the base station 15 via a local interface 49, which can include one or more buses. Furthermore, an input device 52, for example, a keyboard or a mouse, can be used to input data, and screen display 54 or a printer 56 can be used to output data to the user. A disk storage mechanism 58 can be connected to the local interface 49 to transfer data to and from a nonvolatile disk (e.g., magnetic, optical, etc.). The base station 15 can be connected to a network interface 62 that allows the base station 15 to exchange data with a network 64.

The base station 15 also includes an interface 67 for communicating with vehicle interface 32 (FIG. 1) and an interface 69 for communicating with user interface 21. Interfaces 67 and 69 may be implemented by the same device or devices or may be implemented by a separate device or devices.

The base station 15 preferably stores status information in a database 72. In this regard, the database 72 preferably includes a plurality of entries, in which each entry includes status information associated with a particular vehicle 17. For example, an entry may include a data value indicating when a vehicle 17 is expected to arrive at a particular location or indicating whether the vehicle is on schedule. The status information stored in the entry may also define the aforementioned particular location or may include data identifying the packages or passengers, if any, on board the vehicle. Other types of information pertaining to the status of the vehicle 17 may be stored in the entry.

Each entry is preferably correlated with a vehicle identifier that identifies the vehicle 17 described by the status information stored within the entry. Furthermore, the status message may include the vehicle identifier of the vehicle 17 that transmitted the message. Therefore, when a status message is received by the base station 15, the system manager 44 may identify which entries in the database 72 include information that potentially should be updated based on the status message.

Each entry is also correlated with at least one user identifier identifying a user associated with the vehicle 17 described by the information stored in the entry. For example, assume that a user is a passenger scheduled to ride on a particular vehicle 17. At least one of the entries in the database 72 should include information pertaining to the status of the particular vehicle 17 (e.g., indicating whether the particular vehicle 17 is on or off schedule). This entry should be correlated with a user identifier that identifies the foregoing user. Accordingly, when the system manager 44 determines that this user has established communication with the base station 15, the system manager 44 is configured to automatically identify, based on the user identifiers correlated with the entries, each entry associated with the user. Therefore, when the user establishes communication with the interface 69 in the foregoing example, the system manager 44 is configured to automatically identify the aforementioned entry having status information pertaining to the particular vehicle 17 that the user is to ride.

After identifying the entry or entries associated with the user, the system manager 44 is configured to retrieve the status information from the identified entry or entries and to transmit this information to the user. As a result, the user does not need to manually provide inputs to identify which information the system manager 44 should retrieve and transmit to the user.

It should be noted that other methodologies for storing status information and of associating the status information with the appropriate vehicles 17 and users may be employed without departing from the principles of the present invention.

Operation

The preferred use and operation of the system 10 and associated methodology are described hereafter.

Assume for illustrative purposes that a user wishes to ride a vehicle 17 associated with the system 10. Assume further that an entry in the database 72 is associated with this vehicle 17. For example, assume that the entry indicates when the vehicle 17 is expected to arrive at a location, such as the location where the user is to meet the vehicle 17, for example.

At some point, a user identifier identifying the user is correlated with entry. For example, during a registration period, the user may provide his or her telephone number, which is stored in the database 72 and correlated with the entry in the database 72 associated with the vehicle 17. However, it should be noted that other types of user identifiers may be used. For example, the user identifier may be the user's name, the user's home or business address, the user's e-mail address, or other types of values that identify the user.

If the vehicle 17 is early or late, then it may be desirable for the user to change the time at which he or she leaves to meet the vehicle 17. Therefore, before the user travels to the aforementioned location to meet the vehicle 17, it may be desirable for the user to check the status of the vehicle 17 to find out if the vehicle 17 is off schedule. To check the status of the vehicle 17, the user establishes communication with the base station 15 via user interface 21. For example, in the preferred embodiment, the user utilizes interface 21 to establish a telephone call with the interface 69 at the base station 15. In this example, both interfaces 21 and 69 are conventional telephone devices.

The interface 69 is designed to receive caller I.D. information that is automatically transmitted to the interface 69 when communication with the interface 69 is being established. In telephony systems the caller I.D. information is usually transmitted between the ringing signals transmitted to the interface 69, and the caller I.D. information usually includes the telephone number associated with the user interface 21.

Figure 3:
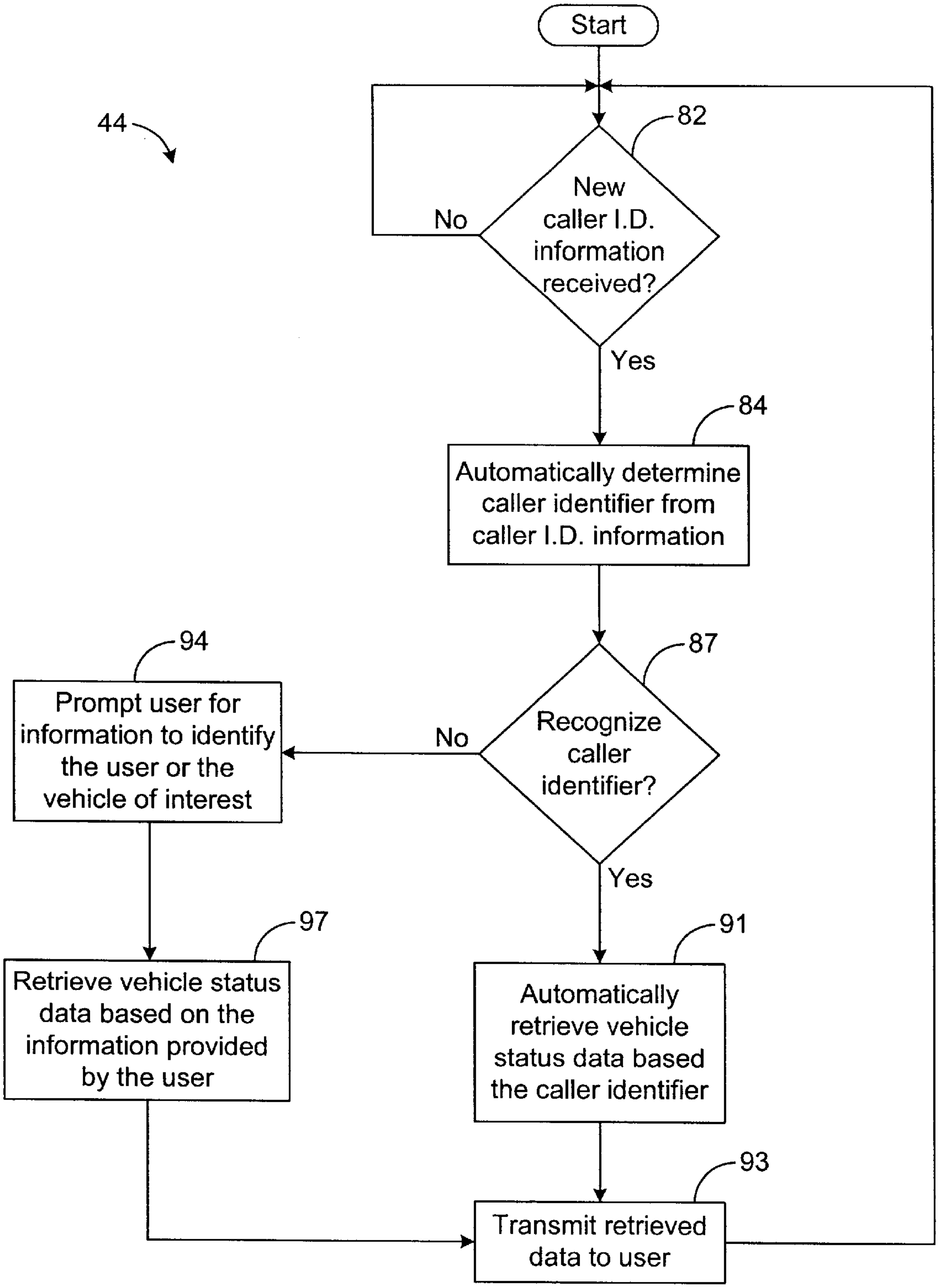
FIG. 3 is a flow chart illustrating the architecture and functionality of a system manager depicted in FIG. 2.

Once the interface 69 has received the caller I.D. information, the system manager 44 automatically searches the caller I.D. information for a caller identifier (e.g., the telephone number provided in the caller I.D. information), as shown by blocks 82 and 84 of FIG. 3. The caller identifier is information in the caller identification information used by the base station 15 to identify a caller. In the preferred embodiment where the user identifier stored in database 72 is the user's telephone number, the system manager 44 searches the caller I.D. information in block 84 for the telephone number defined by the caller I.D. information. This telephone number should be the telephone number associated with interface 21.

After determining the caller identifier from the caller I.D. information, the system manager 44 then searches the database 72 to determine whether the caller identifier corresponds with one of the user identifiers already stored in the database 72, as shown by block 87. For example, in the preferred embodiment, the system manager 44 compares the telephone number included in the caller identification information to the user identifiers stored in the database 72. As long as the user is calling from an interface 21 associated with the same telephone number provided during registration (i.e., the telephone number used by the base station 15 as the user identifier to identify the user), then the telephone number included in the caller I.D. information should correspond to (e.g., match) the user identifier associated with the user.

If a correspondence with a user identifier is determined in block 87, then the system manager 44 automatically retrieves the entry correlated with the user identifier, as shown by block 91. This entry should be the entry having status information pertaining to the vehicle 17 of interest to the user (e.g., the vehicle 17 that the user is planning to ride). The system manager 44 then transmits at least a portion of the retrieved status information to the user via interfaces 21 and 69, as depicted by block 93.

The status information transmitted to user interface 21 preferably indicates whether the aforementioned vehicle 17 is on or off schedule, although other types of information may be indicated by the status information. Note that this status information is provided to the user without the user having to provide any inputs once communication with the interface 69 is established. In this regard, the user merely dials the telephone number associated with the interface 69 in the preferred embodiment, and based on the caller I.D. information automatically provided to the interface 69, the system manager 44 retrieves and transmits the aforementioned status information to the user interface 21. Based on the status information transmitted to the user interface, the user should be able to determine whether the vehicle 17 is on or off schedule.

It should be noted that the base station manger 44 may fail to find a corresponding user identifier in the database 72 in some circumstances. For example, the user may call from an interface 21 associated with a telephone number other than the one provided during registration and, therefore, other than the one used by the base station 15 as a user identifier for the user. In such a situation, the system manager 44 should prompt the user to enter sufficient information so that the system manager 44 can either identify the user or the vehicle 17 of interest, as shown by block 94. For example, the system manager 44 could prompt the user to enter, via touch tone signaling, the user's telephone number or the vehicle number of the vehicle 17 of interest to the user. In this situation, the system manager 44 retrieves the status information from the database 72 based on the inputs provided by the user instead of the caller identifier included in the caller I.D. information, as shown by block 97.

Although the foregoing example has been described herein as utilizing a telephone call to establish communication with the interface 69, the present invention should not be so limited. Any device capable of establishing communication with the interface 69 and of automatically transmitting caller I.D. information to the interface 69 should be suitable for implementing the user interface 21 of the present invention. For example, it is possible for the user interface 21 to establish communication with interface 69 over the Internet. In this example, the user identifier identifying the user could be the user's e-mail or source address. Therefore, upon receiving an e-mail message from interface 21, the system manager 44 in block 84 searches for the sender's e-mail address. This e-mail address is compared with the user identifiers in the database 72 in block 87 to identify the status information that should be transmitted to the user in a return e-mail message. There are various other devices and techniques that may be employed for communicating between interfaces 69 and 23 without departing from the principles of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

What is claimed is:

1. A system for monitoring and reporting status of vehicles, comprising:

a database storing status information associated with a vehicle, said status information indicative of a current proximity of said identified vehicle;

a communication interface configured to communicate with communication devices remotely located from said system; and a system manager configured to receive a message transmitted from said vehicle and to update said status information based on said message, said system manager further configured to analyze caller identification information automatically transmitted to said communication interface when a remote communication device establishes communication with said communication interface, said system manager further configured to automatically search for and locate a set of said status information based on said caller identification information, said system manager further configured to retrieve said set of status information and to transmit said retrieved set of status information to said remote communication device.

2. The system of claim 1, wherein said caller identification information is a telephone number associated with said remote communication device.

3. The system of claim 1, wherein said caller identification information is included within a message transmitted over the internet and received by said communication interface, and wherein said caller identification information is a source address automatically inserted into said message by said remote communication device, said source address identifying an address of said remote communication device.

4. The system of claim 1, wherein said system manager is configured to transmit said retrieved set of status information to said remote communication device in response to said caller identification information.

5. A system for monitoring and reporting status of vehicles, comprising:

means for maintaining status information associated with a vehicle, said status information indicative of a current proximity of said identified vehicle;

means for communicating with a remote communication device, said means for communicating including a means for receiving caller identification information automatically transmitted to said communicating means;

means for utilizing said caller identification information to automatically search for and locate a set of said status information; and means for automatically retrieving and transmitting said set of said status information.

6. The system of claim 5, wherein said caller identification information is a telephone number.

7. The system of claim 5, wherein said caller identification information is an e-mail address.

8. The system of claim 5, further comprising:

means for receiving a status message transmitted from said vehicle; and means for updating said status information based on said status message.

9. The system of claim 5, wherein said status information indicates a proximity of said vehicle from a particular location.

10. A method for monitoring and reporting status of vehicles, comprising the steps of:

maintaining status information associated with a vehicle, said status information indicative of a current proximity of said vehicle;

communicating with a remote communication device;

receiving caller identification information automatically transmitted in said communicating step;

utilizing said caller identification information to automatically search for and locate a set of said status information;

automatically retrieving said set of status information based on said searching for and locating step; and transmitting said retrieved set of status information to said remote communication device.

11. The method of claim 10, wherein said caller identification information is a telephone number.

12. The method of claim 10, wherein said caller identification information is an e-mail address.

13. The method of claim 10, further comprising the steps of:

receiving a status message transmitted from said vehicle; and updating said status information based on said status message.

14. The method of claim 10, further comprising the step of indicating a proximity of said vehicle from a particular location via said status information.

15. The method of claim 10, wherein said utilizing, retrieving, and transmitting steps are performed in response to said receiving step.

* * * * *